Oct. 27, 1931.  J. W. MULARKEY  1,829,489
GASOLINE GAUGE FOR AUTOMOBILES
Filed May 2, 1928
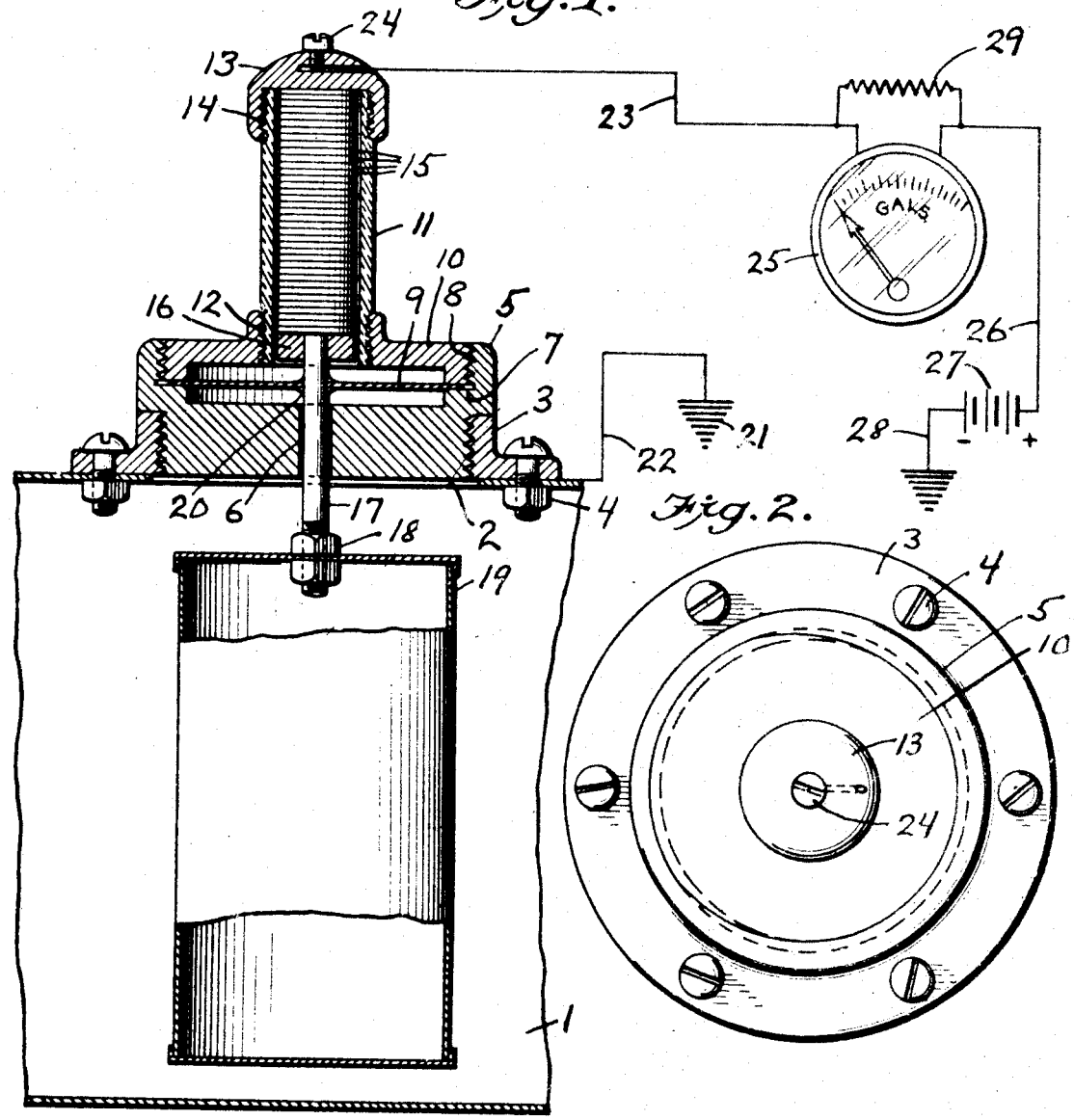
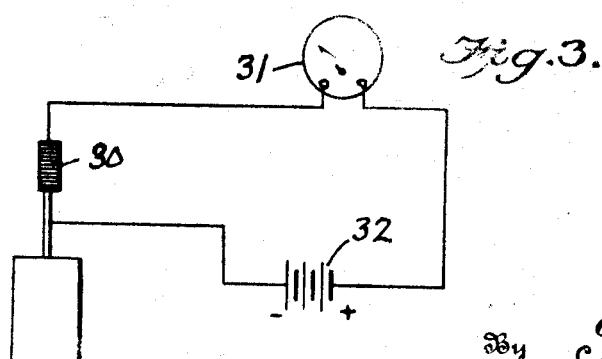
Inventor
J. W. Mularkey
By Rea P. Wright,
Attorney Patented Oct. 27, 1931

1,829,489

UNITED STATES PATENT OFFICE

JOHN W. MULARKEY, OF FERNANDINA, FLORIDA

GASOLINE GAUGE FOR AUTOMOBILES

Application filed May 2, 1928. Serial No. 274,576.

This invention relates to improvements in gasoline tank gauges, but said improvements are also applicable to gauges generally for use in indicating the volume of liquid in a tank, or the height of the liquid level in a mass or stream of liquid.

The primary object of the invention is to furnish a gauge including electrically operated means for indicating the number of gallons or the like of liquid in the tank.

A further object of the invention is to provide a gauge including a float having very slight movement, which movement is transmitted to a carbon pile resistance arranged in an electric circuit having a suitable indicator calibrated in gallons, whereby when the force of bouyancy acts on the float, the indicator will indicate the amount of liquid in the tank.

Another object of the invention is to furnish a liquid level indicator including a carbon pile or the like resistance, arranged in an electric circuit containing an electrically operated indicating instrument; variations of the resistance of the carbon pile effecting movements of the hand or pointer of the indicating instrument.

A further object of the invention is to furnish an electrically operated liquid level indicator of simple and inexpensive construction, and one which will function indefinitely without getting out of order.

With the foregoing objects outlined and with other objects in view which will appear as the description proceeds, my invention consists in the novel features hereinafter described in detail, illustrated in the accompanying drawings, and more particularly pointed out in the appended claims.

Referring to the drawings,

Fig. 1 is a vertical sectional view of the main parts of the gauge mechanism, and a diagram of the electric circuit containing the indicating instrument.

Fig. 2 is a top plan view of the gauge.

Fig. 3 is a diagram of a modification.

The invention is especially applicable to the gasoline tanks of motor vehicles, and my idea is to place the float and the carbon pile resistance on the gasoline supply tank, and to locate the indicating instrument on the instrument board of the vehicle.

In the drawings, 1 indicates a gasoline supply tank having an opening 2 in its top. A ring 3 surrounds this opening and is secured to the tank by any suitable means such as bolts and nuts 4.

The ring 3 has internal screw threads to receive a threaded plug 5 having a centrally disposed aperture or guideway 6. The plug has an internal annular shoulder 7, and internal screw threads 8.

A diaphragm 9 of any suitable material, such as brass, rests on the shoulder 7, and is clamped in position by a threaded disk 10 which engages the threads 8.

A cylinder or tube 11 formed of any suitable insulating material, has its lower end in threaded connection with the disk, as shown at 12, and a cap 13 of metal, is screwed on the upper end of the tube, as shown at 14.

Carbon disks or the like 15, are arranged in a superposed series in the tube 11, and they rest on a plunger 16, fast on a rod 17 that has its lower end securely fastened at 18 to a float 19 of any desired construction.

The rod is fixed to the diaphragm by a sealed joint 20, made of solder or the like. Thus the diaphragm limits the motion of the rod and float, and also serves as a seal to prevent vapors or gasoline from entering the chamber containing the carbon disks.

The device just described is interposed in an electric circuit, including a ground 21, connected by a wire 22 to the tank. Another wire 23 has one of its ends clamped to the cap 13 by a screw 24 or the like, and the other end of this wire is connected to an indicator 25 of the volt meter type, but calibrated for the purposes of the present invention, to indicate gallons of liquid within the tank.

Another wire 26 connects the indicator to a storage battery or the like 27, and a conductor 28 connects the battery to ground. In an automobile, the ground in both cases, will be the frame of the car.

A fixed resistance 29 bridges the wires 23 and 26 for the purpose of keeping the current down to a low value, as the resistance of the carbon pile, (made up of the disks 15) is not very high.

The voltmeter 25 calibrated for the purpose of the present invention to indicate gallons of liquid within the tank works on the drop in voltage across this resistance, for an example, if the current through the circuit, was $\frac{1}{10}$ ampere, and resistance 29, was 60 ohms, there would be $\frac{1}{10} \times 60$ ohms=6 volts drop. If the current through the circuit were increased to $\frac{2}{10}$ amperage, the drop would be $\frac{2}{10} \times 60$ ohms=12 volts, this drop works exactly in proportion to the amperage flowing through the circuit.

In operation, it will be understood that when liquid is placed in the tank 1, the float 19 will tend to rise, and the more liquid in the tank, the greater this tendency. This causes the rod 17 to force the plunger 16 against the lowermost one of the disks 15, and as the disks are pressed tightly together, their resistance is lowered, and this causes an increase in current through the circuit, which in turn causes a deflection of the pointer of the meter or indicator 25.

Instead of hooking the device up in the manner indicated in Fig. 1, the electric circuit as shown in Fig. 3, may include the carbon pile resistance 30, indicating instrument 31, and battery or the like 32, connected by suitable conductors. In this modification, the indicating instrument 31 is of the ammeter type, and calibrated in gallons. I have found in practice that the arrangement shown in Fig. 1, operates best, but have also found that the arrangement illustrated in Fig. 3 is practically workable.

While I have disclosed the invention as embodied in a liquid level indicator, it will be apparent to those skilled in the art, that the rod 17 might be actuated by any other force exerting medium, and I am aware therefore that the principle involved in the present disclosure, may be utilized in other embodiments of the invention, without departing from the spirit of the same, as expressed in the claims.

What I claim and desire to secure by Letters Patent is:

1. The combination with a tank provided with an opening, of a ring secured around said opening having internal screw threads, a threaded plug arranged in said threaded opening having a centrally disposed guide way, said plug having an internal annular shoulder internally threaded, a diaphragm disposed on said shoulder, a threaded disc for clamping said diaphragm on said shoulder, said disc having a threaded aperture, a cylindrical tube formed of insulating material having a threaded end threaded into said threaded opening, a float disposed in said tank having a rod at its upper end extending through said guide way and said diaphragm, a plunger on the upper end of said rod working in said cylinder, said rod being fixed to said diaphragm, and a rheostat arranged in said cylinder above said plunger.

2. The combination with a tank provided with an opening, of a casing disposed on top of said tank for closing said opening, a diaphragm arranged in said casing, said casing being composed of a plurality of superposed members threaded together, a diaphragm arranged in said casing between two of said members and dividing the interior of the same into a plurality of superposed chambers, a rod passing through said diaphragm and connected to the latter by a fluid tight joint, a float carried by the lower end of said rod within said tank, a plunger fixed on the upper end of said rod, and a rheostat arranged in one of said chambers above said plunger.

In testimony whereof I hereunto affix my signature.

JOHN W. MULARKEY.